(12) United States Patent
Ohrui et al.

(10) Patent No.: US 6,646,050 B2
(45) Date of Patent: Nov. 11, 2003

(54) ADHESIVE COMPOSITION COMPRISING (METH) ACRYLIC ESTERS CROSSLINKED BY ISOCYANATE ADDUCTS

(75) Inventors: Tomoo Ohrui, Urawa (JP); Toshio Sugizaki, Omiya (JP)

(73) Assignee: Lintec Corporation, Tokyo (JP)

( * ) Notice: Subject to any disclaimer, the term of this patent is extended or adjusted under 35 U.S.C. 154(b) by 74 days.

(21) Appl. No.: 09/805,088

(22) Filed: Mar. 13, 2001

(65) Prior Publication Data

US 2001/0031835 A1 Oct. 18, 2001

(30) Foreign Application Priority Data

Mar. 14, 2000 (JP) ........................................ 2000/069715
May 30, 2000 (JP) ........................................ 2000/160135

(51) Int. Cl.$^7$ ........................ C09J 133/06; C09J 133/08; C09J 133/10; C09J 175/04
(52) U.S. Cl. ............................ 525/123; 525/60; 525/67; 525/127
(58) Field of Search ............................... 525/123, 127; 528/60, 67

(56) References Cited

U.S. PATENT DOCUMENTS 5,691,015 A * 11/1997 Tsukamoto et al. ...... 206/524.7
5,859,136 A * 1/1999 Scopazzi et al. ............. 524/504
6,025,434 A * 2/2000 Light .......................... 524/590

FOREIGN PATENT DOCUMENTS

JP          58176289 A2 * 10/1983 ........... C09K/03/10
JP          09137143 A2 * 5/1997

OTHER PUBLICATIONS

U.S. application Ser. No. 09/829,061 to Takashi Suzuki et al.

* cited by examiner

Primary Examiner—D. R. Wilson
(74) Attorney, Agent, or Firm—Frishauf, Holtz, Goodman & Chick, P.C.

(57) ABSTRACT

An adhesive composition comprising (A) a copolymer of a (meth)acrylic ester having a Mw of 500,000 to 200,000 and (B) a crosslinking agent comprising an adduct of a polyisocyante comprising (a) isocyanate difunctional adducts of a diisocyanate with a diol (b) adducts of a diisocyanate with a polyhydric alcohol, having an isocyanate functionality of three or greater, in a weight ratio of the amounts of (a) to (b) of 95:5 to 10:90. An adhesive sheet and an adhesive optical component comprising a layer of the adhesive composition. The adhesive composition exhibits excellent adhesion with adherents, and stress relaxation and follows changes in the dimensions of substrates.

7 Claims, 1 Drawing Sheet

US 6,646,050 B2

ADHESIVE COMPOSITION COMPRISING (METH) ACRYLIC ESTERS CROSSLINKED BY ISOCYANATE ADDUCTS

BACKGROUND OF THE INVENTION

1. Field of the Invention

The present invention relates to an adhesive composition and to an adhesive sheet and an adhesive optical component using the adhesive composition. More particularly, the present invention relates to an adhesive composition which exhibits excellent adhesion with adherends and excellent stress relaxation and can follow change in the dimension of substrates and to an adhesive sheet and an adhesive optical component such as a polarizing plate which comprise the adhesive composition.

2. Description of Related Art

When a sheet of an organic material is stuck to an adherend having a hard surface such as glass, ceramics and metals via an adhesive, undesirable phenomena such as peeling and lifting of end portions of the sheet from the adherend tend to take place with passage of the time. To overcome the problem, in general, an adhesive having great adhesive ability enhanced by increasing the molecular weight or the degree of crosslinking of a resin component constituting the adhesive is used. However, when contraction or expansion of a substrate takes place by change in the temperature or the humidity, the adhesive cannot follow the change in the dimension of the substrate since such an adhesive is hard and has small elasticity. Therefore, the use of such an adhesive causes various problems although the holding ability can be enhanced.

Some optical components are used after a polarizing plate is attached to the surface. Typical examples of such optical components include liquid crystal cells in liquid crystal displays (LCD). In general, a liquid crystal cell has a structure in which two transparent electrode substrates having an oriented layer are placed in a manner such that a specific gap is formed between them and the oriented layers face to each other at the inside, peripheral portions are sealed, a liquid crystalline material is placed inside the gap between the transparent electrode substrates and a polarizing plate is disposed on each outer surface of the two transparent electrode substrates via an adhesive layer.

FIG. 1 shows a perspective view exhibiting the structure of an example of the polarizing plate described above. As shown in FIG. 1, the polarizing plate 10 has a substrate having a three-layer structure in which triacetylcellulose (TAC) film I 2 and TAC film II 2' are laminated on the faces of a polarizing plate 1 made of polyvinyl alcohol. On one face of the substrate, an adhesive layer 3 for adhering the substrate with an optical component such as a liquid crystal cell is formed. A release sheet 4 is attached to the adhesive layer 3. In general, a film for protecting the surface 5 is disposed on the face of the polarizing plate opposite to the face having the adhesive layer 3.

When the above polarizing plate is attached to the above liquid crystal cell, the release sheet 4 is removed first, then the polarizing plate is attached to the liquid crystal cell via the exposed adhesive layer and the film for protecting the surface 5 is removed.

The polarizing plate which is attached to the liquid crystal cell via the adhesive layer has the three-layer structure described above. Due to the properties of the materials, the polarizing plate has poor dimensional stability and, in particular, change in the dimension by contraction or expansion is great in the environment of a high temperature or a high temperature and a high humidity.

However, since, in general, an adhesive having a great adhesive ability is used in the above polarizing plate as described above, stress caused by the change in the dimension of the polarizing plate cannot be absorbed and relaxed by the adhesive layer although lifting and peeling caused by the change in the dimension of the polarizing plate can be suppressed. More specifically, TAC film II 2' at the front face tends to contract or expand due to change in the humidity and the temperature. On the other hand, TAC film I 2 cannot contract or expand easily since TAC film I is firmly adhered to the liquid crystal cell via the adhesive layer 3 and the adhesive layer cannot flexibly follow the change in the dimension. As the result, ray passing through TAC film I toward TAC film II cannot proceed straight. This causes undesirable phenomena such as formation of blank spots.

To overcome the above problem, heretofore, a plasticizer is added to the adhesive so that the adhesive is flexible to a suitable degree and stress relaxation takes place. However, the adhesive containing a plasticizer has drawbacks in that the plasticizer bleeds out and that the adherend is stained with the plasticizer when the polarizing plate is peeled by the bleeding out. As another method to overcome the above problem, the number of crosslinking in the adhesive is decreased by using a polyfunctional crosslinking agent having a functionality of three or greater. However, the holding ability, i.e., the adhesion with the adherend, inevitably decreases in this case and problems such as lifting and peeling of the polarizing plate tend to arise with passage of the time.

SUMMARY OF THE INVENTION

The present invention has a first object of providing an adhesive composition which exhibits excellent adhesion with an adherend, suppresses lifting and peeling, provides excellent stress relaxation without using plasticizers, can follow change in the dimension of the substrate in the adherend, can prevent staining of the adherend and is advantageously used for optical components.

The present invention has a second object of providing an adhesive sheet which comprises a layer comprising the above adhesive composition and a third object of providing an adhesive optical component which comprises a layer comprising the above adhesive composition.

As the result of intensive studies by the present inventors to achieve the above objects, it was found that the first object can be achieved with an adhesive composition which comprises a copolymer of (meth)acrylic esters and a specific crosslinking agent or with an adhesive composition which comprises a copolymer of (meth)acrylic esters having a great molecular weight, an oligomer of (meth)acrylic esters having a small molecular weight and a crosslinking component comprising a difunctional crosslinking agent each in a specific amount.

It was also found that the second object can be achieved by disposing a layer comprising the adhesive composition described above at least on one face of a substrate sheet and that the third object can be achieved by disposing a layer comprising the adhesive composition described above at least on one face of an optical component of a sheet form.

The present invention has been completed based on the above knowledge.

The present invention provides:

(1) An adhesive composition which comprises (A) a copolymer of (meth)acrylic esters and (B) a crosslinking agent comprising an adduct of a polyisocyanate compound which comprises difunctional adducts and adducts having a functionality of three or greater in amounts such that a ratio of the amounts by weight is in a range of 100:0 to 10:90 (this adhesive composition will be referred to as adhesive composition I, hereinafter);

(2) An adhesive sheet comprising a substrate sheet and a layer which comprises adhesive composition I described in (1) and is disposed at least on one face of the substrate sheet (this adhesive sheet will be referred to as adhesive sheet I, hereinafter);

(3) An adhesive optical component comprising an optical component of a sheet form and a layer which comprises adhesive composition I described in (1) and is disposed at least on one face of the optical component of a sheet form (this adhesive optical component will be referred to as adhesive optical component I, hereinafter);

(4) An adhesive composition which comprises (C) a copolymer of (meth)acrylic esters having a weight-average molecular weight of 1,000,000 or greater and, per 100 parts by weight of component (C), (D) 5 to 100 parts by weight of an oligomer of (meth)acrylic esters having a weight-average molecular weight of 1,000 to 10,000 and (E) 0.001 to 50 parts by weight of a crosslinking component comprising a difunctional crosslinking agent (this adhesive composition will be referred to as adhesive composition II, hereinafter);

(5) An adhesive sheet comprising a substrate sheet and a layer which comprises adhesive composition II described in (4) and is disposed at least on one face of the substrate sheet (this adhesive sheet will be referred to as adhesive sheet II, hereinafter); and (6) An adhesive optical component comprising an optical component of a sheet form and a layer which comprises adhesive composition II described in (4) and is disposed at least on one face of the optical component of a sheet form (this adhesive optical component will be referred to as adhesive optical component II, hereinafter).

Figure 1:
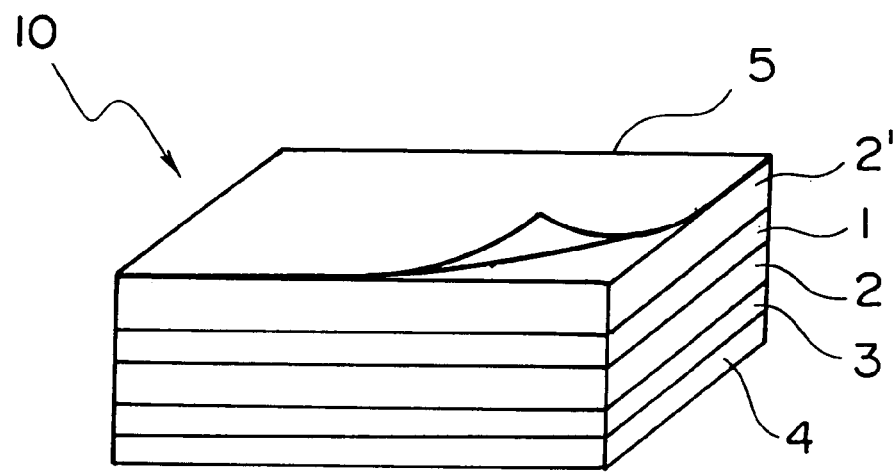
FIG. 1 shows a perspective view exhibiting the structure of an example of a polarizing plate.

In the figure, 1 means a polarizing plate made of polyvinyl alcohol, 2 means TAC film I, 2' means TAC film II, 3 means a layer of an adhesive, 4 means a release sheet, 5 means a film for protecting the surface and 10 means a polarizing plate.

DESCRIPTION OF THE PREFERRED EMBODIMENTS

Adhesive composition I of the present invention will be described in the following.

Adhesive composition I of the present invention comprises a copolymer of (meth)acrylic esters as component (A) and a crosslinking agent comprising an adduct of a polyisocyanate compound as component (B).

As the copolymer of (meth)acrylic esters of component (A), copolymers having portions for crosslinking which can be crosslinked with the crosslinking agent of component (B) are used. The copolymer of (meth)acrylic ester having such portions for crosslinking is not particularly limited. A copolymer suitably selected from copolymers of (meth) acrylic esters which are conventionally used as the resin component of adhesives can be used.

Examples of the copolymer of (meth)acrylic ester having such portions for crosslinking include copolymers of a (meth)acrylic ester in which the alkyl group in the ester portion has 1 to 20 carbon atoms, a monomer having a functional group having an active hydrogen and other monomers which are used where desired.

Examples of a (meth)acrylic ester in which the alkyl group in the ester portion has 1 to 20 carbon atoms include methyl (meth)acrylate, ethyl (meth)acrylate, propyl (meth)acrylate, butyl (meth)acrylate, pentyl (meth)acrylate, hexyl (meth) acrylate, cyclohexyl (meth) acrylate, 2-ethylhexyl (meth)acrylate, isooctyl (meth)acrylate, decyl (meth) acrylate, dodecyl (meth)acrylate, myristyl (meth)acrylate, palmityl meth)acrylate and stearyl (meth)acrylate. The (meth)acrylic ester may be used singly or in combination of two or more.

Examples of the monomer having a functional group having an active hydrogen include hydroxyalkyl esters of (meth)acrylic acid such as 2-hydroxyethyl (meth)acrylate, 2-hydroxypropyl (meth)acrylate, 3-hydroxypropyl (meth) acrylate, 2-hydroxybutyl (meth)acrylate, 3-hydroxybutyl (meth)acrylate and 4-hydroxybutyl (meth)acrylate; acrylamides such as acrylamide, methacrylamide, N-methylacrylamide, N-methylmethacrylamide, N-methylolacrylamide and N-methylolmethacrylamide; monoalkylaminoalkyl (meth)acrylates such as monomethylaminoethyl (meth)acrylate, monoethylaminoethyl (meth) acrylate, monomethylaminopropyl (meth)acrylate and monoethylaminopropyl (meth)acrylate; and ethylenically unsaturated carboxylic acids such as acrylic acid, methacrylic acid, crotonic acid, maleic acid, itaconic acid and citraconic acid. The above monomers may be used singly or in combination of two or more.

Examples of the other monomers which are used where desired include vinyl esters such as vinyl acetate and vinyl propionate; olefins such as ethylene, propylene and isobutylene; halogenated olefins such as vinyl chloride and vinylidene chloride; styrenic monomers such as styrene and α-methylstyrene; diene monomers such as butadiene, isoprene and chloroprene; nitrile monomers such as acrylonitrile and methacrylonitrile; N,N-dialkyl-substituted acrylamindes such as N,N-dimethylacrylamide and N,N-dimethylmethacrylamide. The above monomers may be used singly or in combination of two or more.

In adhesive composition I of the present invention, the structure of the copolymer of (meth)acrylic esters used as component (A) is not particularly limited and any of random copolymers, block copolymers and graft copolymers can be used. As for the molecular weight, it is preferable that the weight-average molecular weight is in the range of 500,000 to 2,000,000. When the weight-average molecular weight is smaller than 500,000, there is the possibility that adhesion and durability of adhesion with the adherend are insufficient. When the weight-average molecular weight exceeds 2,000,000, the property of following change in the dimension of the substrate may deteriorate. From the standpoint of adhesion, durability of adhesion and the property of following change in the dimension of the substrate, it is preferable that the weight-average molecular weight is 800,000 to 1,800,000 and more preferably 1,200,000 to 1,600,000.

The weight-average molecular weight described above is the weight-average molecular weight of the corresponding polystyrene obtained in accordance with the gel permeation chromatography (GPC).

In the present invention, the copolymer of (meth)acrylic esters of component (A) may be used singly or in combination of two or more.

In adhesive composition I of the present invention, as component (B), an adduct of a polyisocyanate compound is used. The polyisocyanate compound for forming the adduct is not particularly limited and various conventional compounds can be used. Examples of the polyisocyanate compound include aromatic polyisocyanates such as tolylene diisocyanate, diphenylmethane diisocyanate and xylylene diisocyanate; aliphatic polyisocyanates such as hexamethylene diisocyanate; and alicyclic polyisocyanates such as isophorone diisocyanate and hydrogenated diphenylmethane diisocyanate.

As the adduct of a polyisocyanate compound, in the present invention, an adduct comprising difunctional adducts and adducts having a functionality of three or greater in the amounts such that the ratio of the amount by weight of the former adducts to the amount by weight of the latter adducts is 100:0 to 10:90, is used. In other words, an adduct comprising difunctional adducts alone or a mixture of difunctional adducts and adducts having a functionality of three or greater is used. When the mixture is used, it is necessary that the content of the adducts having a functionality of three or greater be 90% by weight or smaller of the total amount of the difunctional adducts and the adducts having a functionality of three or greater. When the content exceeds 90% by weight, the effect of providing stress relaxation to the adhesive composition is not sufficiently exhibited and the object of the present invention is not achieved. The adduct having a functionality of three or greater exhibits the effect of improving adhesion and durability of adhesion with the adherend. When the mixture is used, from the standpoint of adhesion, durability of adhesion and the effect of providing stress relaxation, it is preferable that the ratio of the amount by weight of the difunctional adducts to the amount by weight of the adducts having a functionality of three or greater is in the range of 95:5 to 30:70 and more preferably in the range of 90:10 to 50:50.

The difunctional adducts and the adducts having a functionality of three or greater can be produced in accordance with a conventional process. For example, the difunctional adduct can be prepared by reacting the polyisocyanate compound described above with a diol such as ethylene glycol, 1,3-propanediol, 1,4-butanediol, 1,6-hexanediol, polyethylene glycol, polypropylene glycol and polytetramethylene glycol using the polyisocyanate in an amount somewhat exceeding the stoichiometric amount.

The adduct having a functionality of three or greater can be prepared by reacting the polyisocyanate compound described above with a polyhydric alcohol having three or more hydroxyl groups in the molecule such as glycerol, trimethylolpropane, trimethylolethane, pentaerythritol and dimers of these compounds using the polyisocyanate in an amount somewhat exceeding the stoichiometric amount.

From the standpoint of the effect of providing stress relaxation, the weight-average molecular weight of the adduct is selected generally in the range of 100 to 100,000 and preferably in the range of 500 to 10,000.

In the present invention, from the standpoint of adhesion with the adherend and the property of following change in the dimension of the substrate (stress relaxation), it is advantageous that the crosslinking agent of component (B) is used generally in an amount of 0.001 to 50 parts by weight and preferably in an amount of 0.01 to 10 parts by weight per 100 parts by weight of the copolymer of (meth)acrylic esters of component (A).

Adhesive composition II of the present invention will be described in the following.

Adhesive composition II of the present invention is an adhesive composition of the crosslinking type which comprises (C) a copolymer of (meth)acrylic esters, (D) an oligomer of (meth)acrylic esters and (E) a crosslinking component.

As the copolymer of (meth)acrylic esters of component (C), a copolymer of (meth)acrylic esters having portions for crosslinking which can be crosslinked in accordance with various crosslinking processes is used. The copolymer of (meth)acrylic esters having portions for crosslinking is not particularly limited. A copolymer suitably selected from copolymers of (meth)acrylic esters which are conventionally used as the resin component of adhesive compositions is used.

Examples of the copolymer of (meth)acrylic esters having portions for crosslinking include copolymers of a (meth)acrylic ester in which the alkyl group in the ester portion has 1 to 20 carbon atoms, a monomer having a crosslinking functional group in the molecule and other monomers which are used where desired.

Examples of the (meth)acrylic ester in which the alkyl group in the ester portion has 1 to 20 carbon atoms, the monomer having a crosslinking functional group in the molecule and the other monomers which are used where desired include the (meth)acrylic ester in which the alkyl group in the ester portion has 1 to 20 carbon atoms, the monomer having a functional group having an active hydrogen (a crosslinking functional group) in the molecule and the other monomers which are used where desired, respectively, which are described as the examples of the components for the copolymer of (meth)acrylic esters of component (A) used in adhesive composition I.

In adhesive composition II of the present invention, the structure of the copolymer of (meth)acrylic esters used as component (C) is not particularly limited and any of random copolymers, block copolymers and graft copolymers can be used. As for the molecular weight, a copolymer having a weight-average molecular weight greater than 1,000,000 is used. When the weight-average molecular weight is smaller than 1,000,000, there is the possibility that adhesion and durability of adhesion with the adherend are insufficient and lifting and peeling take place. When the weight-average molecular weight is excessively great, the property of following change in the dimension of the substrate (stress relaxation) may deteriorate. From the standpoint of adhesion, durability of adhesion and the property of following change in the dimension of the substrate, it is preferable that the weight-average molecular weight is 1,200,000 to 2,200,000 and more preferably 1,500,000 to 2,000,000.

The weight-average molecular weight described above is the weight-average molecular weight of the corresponding polystyrene obtained in accordance with the gel permeation chromatography (GPC).

It is preferable that the copolymer of (meth)acrylic esters has a content of the monomer unit having a crosslinking functional group in the molecule in the range of 0.01 to 10% by weight. When the content is smaller than 0.01% by weight, the number of crosslink is too small and the crosslinking becomes insufficient. Therefore, there is the possibility that adhesion with the adherend deteriorates. When the content exceeds 10% by weight, the degree of crosslinking is excessively great and there is the possibility that the property of following change in the dimension of the substrate (stress relaxation) deteriorates. From the standpoint of adhesion with the adherend and the property of following change in the dimension of the substrate, it is preferable that the content of the monomer unit having a crosslinking functional group is in the range of 0.05 to 6.0% and more preferably in the range of 0.2 to 3.0%.

In the present invention, the copolymer of (meth)acrylic esters of component (C) may be used singly or in combination of two or more.

As the oligomer of (meth)acrylic ester of component (D), any of oligomers obtained by homopolymerizing one compound selected from (meth)acrylic esters in which the alkyl group in the ester portion has 1 to 20 carbon atoms, oligomers obtained by copolymerizing at least two compounds selected from the above (meth)acrylic esters and oligomers obtained by copolymerizing at least one compound selected from the above (meth)acrylic esters with other monomers, may be used.

Examples of the (meth)acrylic ester in which the alkyl group in the ester portion has 1 to 20 carbon atoms and the other monomers include the (meth)acrylic ester in which the alkyl group in the ester portion has 1 to 20 carbon atoms and the other monomers, respectively, which are described as the examples of the components for the copolymer of (meth) acrylic esters of component (A) used in adhesive composition I.

The weight-average molecular weight of the oligomer of (meth)acrylic esters of component (D) is selected in the range of 1,000 to 10,000. When the molecular weight is smaller than 1,000, the oligomer bleeds out and there is the possibility that an adherend is stained when a substrate adhered to the adherend via the adhesive composition is removed. When the molecular weight exceeds 10,000, the property of the adhesive composition of following change in the dimension of the substrate (stress relaxation) deteriorates and the object of the present invention cannot be achieved. From the standpoint of preventing staining of an adherend and the property of following change in the dimension of the substrate, it is preferable that the weight-average molecular weight of the oligomer of (meth)acrylic esters is in the range of 4,000 to 10,000.

It is preferable that the oligomer of (meth)acrylic esters has a ratio of the weight-average molecular weight (Mw) to the number-average molecular weight (Mn), which represents the molecular weight distribution, of 2.0 or smaller. When the ratio Mw/Mn exceeds 2.0, there is the possibility that the oligomer contains components having excessively small molecular weights. Such components may cause bleeding out of the oligomer and staining of an adherend when a substrate adhered to the adherend via the adhesive composition is removed. It is preferable that the ratio Mw/Mn is 1.7 or smaller.

The weight-average molecular weight and the number-average molecular weight described above are the weight-average molecular weight and the number-average molecular weight, respectively, of the corresponding polystyrene obtained in accordance with the gel permeation chromatography (GPC).

In the present invention, the oligomer of (meth)acrylic esters of component (D) may be used singly or in combination of two or more.

In adhesive composition II of the present invention, it is necessary that the oligomer of (meth)acrylic esters of component (D) be used in an amount of 5 to 100 parts by weight per 100 parts by weight of the copolymer of (meth)acrylic esters of component (C). When the amount of component (D) is smaller than 5 parts by weight, the property of following change in the dimension of the substrate (stress relaxation) becomes insufficient. When the amount of component (D) exceeds 100 parts by weight, adhesion with the adherend becomes poor. From the standpoint of the property of following change in the dimension of the substrate and adhesion with the adherend, it is preferable that the amount of component (D) is in the range of 10 to 70 parts by weight and more preferably in the range of 15 to 50 parts by weight.

In adhesive composition II of the present invention, the crosslinking component used as component (E) comprises at least a difunctional crosslinking agent. The difunctional crosslinking agent is not particularly limited. A compound which is conventionally used as the crosslinking agent can be used. The difunctional crosslinking agent is suitably selected from crosslinking agents such as polyisocyanate compounds, epoxy compounds, metal chelate compounds, metal alkoxides and metal salts in accordance with the type of the crosslinking functional group in the copolymer of component (C).

In the present invention, as the crosslinking component of component (E), a crosslinking agent comprising a difunctional crosslinking agent and a crosslinking agent having a functionality of three or greater in the amounts such that the ratio of the amount by weight of the former agent to the amount by weight of the latter agent is 100:0 to 10:90, is preferably used. In other words, a difunctional crosslinking agent alone or a mixture of a difunctional crosslinking agent and a crosslinking agent having a functionality of three or greater is used. When the mixture is used, it is preferable that the content of the crosslinking agent having a functionality of three or greater is 90% by weight or smaller of the total amount of the difunctional crosslinking agent and the crosslinking agent having a functionality of three or greater. When the content exceeds 90% by weight, there is the possibility that the effect of providing stress relaxation to the adhesive composition is not sufficiently exhibited. The crosslinking agent having a functionality of three or greater exhibits the effect of improving adhesion and durability of adhesion with the adherend. When the mixture is used, from the standpoint of adhesion, durability of adhesion and the effect of providing stress relaxation, it is preferable that the ratio of the amount by weight of the difunctional crosslinking agent to the amount by weight of the crosslinking agent having a functionality of three or greater is in the range of 95:5 to 30:70 and more preferably in the range of 90:10 to 50:50.

In the present invention, it is preferable that the crosslinking is conducted using an epoxy compound or a polyisocyanate compound as the crosslinking component comprising a difunctional crosslinking agent. Examples of the epoxy compound include sorbitol polyglycidyl ether, polyglycerol polyglycidyl ether, pentaerythritol polyglycidyl ether, diglycerol polyglycidyl ether, glycerol polyglycidyl ether, trimethylol-propane polyglycidyl ether, resorcinol diglycidyl ether, neopentyl glycol diglycidyl ether, 1,6-hexanediol diglycidyl ether, hydrogenated bisphenol A diglycidyl ether, polyethylene glycol diglycidyl ether and polypropylene glycol diglycidyl ether. Examples of the polyisocyanate compound include aromatic polyisocyanates such as tolylene diisocyanate, diphenylmethane diisocyanate and xylylene diisocyanate; aliphatic polyisocyanates such as hexamethylene diisocyanate; alicyclic polyisocyanates such as isophorone diisocyanate and hydrogenated diphenylmethane diisocyanate; biuret compounds and isocyanurate compounds of the above polyisocyanates; and adducts which are reaction products of the above polyisocyanates with low molecular weight compounds having active hydrogen.

In the present invention, as the crosslinking component comprising a difunctional crosslinking agent, adducts of polyisocyanate compounds are preferable and mixtures containing a difunctional adduct of a polyisocyanate compound and an adduct of a polyisocyanate compound having a functionality of three or greater in the above relative amounts are more preferable.

The difunctional adduct of a polyisocyanate compound and the adduct of a polyisocyanate compound having a functionality of three or greater are as described in the above for the crosslinking agent of component (B) of adhesive composition I.

In the present invention, from the standpoint of adhesion with the adherend and the property of following change in the dimension of the substrate (stress relaxation), it is preferable that the crosslinking component of component (E) is used in an amount of 0.001 to 50 parts by weight and more preferably 0.01 to 10 parts by weight per 100 parts by weight of the copolymer of (meth)acrylic esters of component (C). In particular, it is preferable that the adduct of a polyisocyanate compound described above is used in an amount of 0.01 to 10 parts by weight and more preferably in an amount of 0.1 to 5 parts by weight.

Adhesive compositions I and II of the present invention may further comprise various additives conventionally used for adhesive compositions such as plasticizers, silane coupling agents, ultraviolet light absorbents and antioxidants as long as the objects of the present invention are not adversely affected, where desired.

When a silane coupling agent, among the above additives, is added to the adhesive composition, adhesion to a liquid crystal cell (glass) under a hot and humid condition is improved and lift and peeling of the polarizing plate are suppressed. As the silane coupling agent, organic silicon compounds which have at least one alkoxysilyl group in the molecule, are compatible with the components of the adhesive composition and transmit light are preferably used. For example, substantially transparent organic silicon compounds having these properties are used. It is preferable that the amount of the silane coupling agent is in the range of 0.001 to 10 parts by weight and more preferably in the range of 0.005 to 5 parts by weight per 100 parts by weight of the adhesive composition.

In adhesive compositions I and II of the present invention, it is preferable that a layer of the adhesive composition having a thickness of 30 μm which is formed on a substrate has a shear modulus in the range of 4.0 to 20 N/cm$^2$ and more preferably in the range of 5.0 to 10 N/cm$^2$. When the shear modulus is smaller than 4.0 N/cm$^2$, cohesive fracture and interfacial fracture tend to take place due to the shear stress formed by change in the dimension of the substrate. When the shear modulus exceeds 20 N/cm$^2$, there is the possibility that the effect of relaxing the stress formed by change in the dimension of the substrate and preventing local concentration of residual stress is not sufficiently exhibited.

It is preferable that the layer of the adhesive composition has a relaxation modulus G(100) after 100 seconds in the range of 1.0 to 6.0 N/cm$^2$ and more preferably in the range of 2.0 to 5.0 N/cm$^2$. The relaxation modulus G(100) is obtained as follows. When a specific strain $\gamma_o$ is applied and then the stress is relaxed for a time t, the stress σ(t) at the time t is regarded to be proportional to $\gamma_o$ and G(t) as expressed in the equation σ(t)=G(t)$\gamma_o$. G(t) in this equation is defined as the relaxation modulus. In the present invention, the time t is set at 100 seconds.

When the relaxation modulus is smaller than 1.0 N/cm$^2$, cohesive fracture and interfacial fracture tend to take place. When the relaxation modulus exceeds 6.0 N/cm$^2$, there is the possibility that the effect of relaxing the stress formed by change in the dimension of the substrate and preventing local concentration of residual stress is not sufficiently exhibited.

Adhesive compositions I and II of the present invention having the above properties exhibit excellent adhesion with an adherend, suppress lifting and peeling, provide excellent stress relaxation and can follow change in the dimension of the substrate. Therefore, when the adhesive compositions are applied to liquid crystal cells, formation of blank spots and uneven color can be prevented. Thus, the adhesive compositions can be advantageously used for optical components.

When adhesive compositions I and II of the present invention are used for optical components, the adhesive compositions which transmit light are advantageously used.

Adhesive sheets I and II of the present invention comprise a substrate sheet and layers comprising above adhesive compositions I and II, respectively, (occasionally referred to as adhesive layers, hereinafter) disposed at least on one face of the substrate sheet. Examples of the substrate sheet include paper substrate sheets such as glassine paper, coated paper and cast paper; laminate papers obtained by laminating a thermoplastic resin such as polyethylene on the paper substrate; polyester films such as films of polyethylene terephthalate, polybutylene phthalate and polyethylene naphthalate; polyolefin films such as films of polypropylene and polymethylpentene; plastic films such as films of polycarbonate and cellulose acetate; and laminate sheets containing these sheets. The substrate sheet is suitably selected in accordance with the application of the adhesive sheet.

Adhesive sheets I and II of the present invention can be used as a component for transferring the adhesive layer to an adherend or as a component for sticking the adhesive sheet to a desired adherend. When the adhesive sheet is used in the former application, in general, a substrate sheet is coated with a release agent such as a silicone resin. In this case, the thickness of the substrate sheet is not particularly limited. In general, the thickness is 20 to 150 μm.

When the adhesive sheet is used in the latter application, the type and the thickness of the substrate sheet are suitably selected in accordance with the application. A conventional release sheet may be disposed on the adhesive layer, where desired.

In adhesive sheet I and II of the present invention, the thickness of the adhesive layer is generally about 5 to 150 μm and preferably about 10 to 90 μm.

Adhesive optical components I and II of the present invention comprise an optical component of a sheet form which will be described in the following and above adhesive compositions I and II, respectively, disposed at least on one face of the optical component of a sheet form.

The optical component of a sheet form is not particularly limited. Examples of the optical component of a sheet form include polarizing plates, plates for phase differentiation, plates for preventing reflection and films for expanding visual angle. Polarizing plates are preferable among these optical components. Examples of the polarizing plates include polarizing plates for liquid crystal display apparatuses, for adjustment of quantity of light, for apparatuses using interference of polarized light and for optical detectors of defects. Among these polarizing plates, polarizing plates having the adhesive layer are advantageously used for liquid crystal cells in liquid crystal display apparatuses.

Adhesive compositions I and II of the present invention exhibit excellent adhesion with the adherend, provides excellent stress relaxation without using plasticizers, can follow change in the dimension of the substrate and can prevent staining of the adherend. When the adhesive compositions are applied to polarizing plates for liquid crystal cells, lifting and peeling can be suppressed and formation of blank spots and uneven color can be prevented.

EXAMPLES

The present invention will be described more specifically with reference to examples in the following. However, the present invention is not limited to the examples.

The properties in the examples were evaluated in accordance with the following methods.

(1) Shear modulus and relaxation modulus of an adhesive layer in an adhesive optical component The shear modulus and the relaxation modulus were measured using an apparatus for measuring moduli "RHEOMETRICS RDS-II" manufactured by RHEOMETRICS Company.

(2) Durability of an adhesive optical component

The durability was evaluated under the condition of 100° C., dry and 1,000 hours and under the condition of 60° C., 90% RH and 1,000 hours. The obtained results were evaluated in accordance with the following criteria:

with respect to changes in the appearance of lifting, peeling and formation of foams

| excellent | no changes at all |
| good | almost no changes |
| fair | some changes |
| poor | marked changes |

(3) Formation of blank spots in an adhesive optical component

The formation of blank spots was evaluated under the condition of 100° C., dry and 1,000 hours and under the condition of 60° C., 90% RH and 1000 hours. The obtained results were evaluated in accordance with the following criteria:

| excellent | no blank spots in visual observation |
| good | almost no blank spots in visual observation |
| fair | significant blank spots |
| poor | marked blank spots |

(4) Staining of glass

An adhesive optical component was attached to a glass plate. After one day, the adhesive optical component was removed and the condition of the glass was visually observed. The result was evaluated in accordance with the following criteria:

| good | not stained |
| poor | stained |

Example 1

Into 200 parts by weight of toluene, 100 parts by weight of a copolymer of acrylic esters having a weight-average molecular weight of 1,500,000 (containing 84% by weight of the unit of butyl acrylate, 15% by weight of the unit of methyl acrylate and 1% by weight of the unit of 2-hydroxyethyl acrylate), 0.5 parts by weight of a difunctional adduct of isophorone diisocyanate (manufactured by MITSUBISHI KAGAKU Co., Ltd.; the trade name: NY-T-35C; the weight-average molecular weight: 3,000) and 0.2 parts by weight of a silane coupling agent (3-glycidoxypropyltrimethoxysilane) were added and a solution of an adhesive was prepared.

A substrate sheet of a polyethylene terephthalate film having a thickness of 38 $\mu$m which was coated with a silicone resin on one face (manufactured by LINTEC Corporation; the trade name: SP PET38) was coated with the solution of an adhesive prepared above on the face coated with a silicone resin. The substrate sheet coated with the solution of an adhesive was dried at 100° C. for 1 minute and an adhesive sheet having an adhesive layer having a thickness of 30 $\mu$m was prepared.

The prepared adhesive sheet was laminated to one face of a polarizing plate having a three-layer laminate structure composed of a film of triacetylcellulose, a film of polyvinyl alcohol and a film of triacetylcellulose in a manner such that the layer of the adhesive is attached to the polarizing plate. The obtained laminate was aged at the ordinary temperature for one week and an adhesive optical component having a length of 80 mm and a width of 150 mm was prepared.

Then, using two adhesive optical components prepared above, the substrate sheets in the adhesive optical components were removed and the remaining adhesive optical components were laminated to both faces of a glass plate for a liquid crystal cell via the exposed layer of the adhesive so that an orthogonal Nicol is formed.

The results of evaluation of the properties are shown in Table 1.

Example 2

Into 200 parts by weight of toluene, 100 parts by weight of the copolymer of acrylic esters used in Example 1, 0.1 part by weight of the difunctional adduct of isophorone diisocyanate used in Example 1, 0.1 part by weight of a trifunctional adduct of xylylene diisocyanate (manufactured by TAKEDA YAKUHIN KOGYO Co., Ltd.; the trade name: TAKENATE D-110N; the weight-average molecular weight: 1,100) and 0.2 parts by weight of the silane coupling agent used in Example 1 were added and a solution of an adhesive was prepared.

Subsequently, the same procedures as those conducted in Example 1 were conducted. The results of evaluation of the properties are shown in Table 1.

Example 3

Into 400 parts by weight of toluene, 100 parts by weight of the copolymer of acrylic esters used in Example 1 and 0.5 parts by weight of the difunctional adduct of isophorone diisocyanate used in Example 1 were added and a solution of an adhesive was prepared.

Subsequently, the same procedures as those conducted in Example 1 were conducted. The results of evaluation of the properties are shown in Table 1.

Comparative Example 1

Into 200 parts by weight of toluene, 100 parts by weight of the copolymer of acrylic esters used in Example 1, 0.2 parts by weight of an adduct of trimethylolpropane and tolylene diisocyanate (a trifunctional crosslinking agent) and 0.2 parts by weight of the silane coupling agent used in Example 1 were added and a solution of an adhesive was prepared.

Subsequently, the same procedures as those conducted in Example 1 were conducted. The results of evaluation of the properties are shown in Table 1.

Comparative Example 2

Into 200 parts by weight of toluene, 100 parts by weight of the copolymer of acrylic esters used in Example 1, 0.2 parts by weight of an adduct of trimethylolpropane and tolylene diisocyanate (a trifunctional crosslinking agent), 10 parts by weight of trioctyl trimellitate as the plasticizer and 0.2 parts by weight of the silane coupling agent used in Example 1 were added and a solution of an adhesive was prepared.

Subsequently, the same procedures as those conducted in Example 1 were conducted. The results of evaluation of the properties are shown in Table 1.

Comparative Example 3

Into 400 parts by weight of toluene, 100 parts by weight of the copolymer of acrylic esters used in Example 1 and 0.2 parts by weight of an adduct of trimethylolpropane and tolylene diisocyanate (a trifunctional crosslinking agent) were added and a solution of an adhesive was prepared.

Subsequently, the same procedures as those conducted in Example 1 were conducted. The results of evaluation of the properties are shown in Table 1.

acrylate; the Mw/Mn ratio: 1.5) and 0.5 parts by weight of a difunctional adduct of isophorone diisocyanate (manufactured by MITSUBISHI KAGAKU Co., Ltd.; the trade name: NY-T-35C; the weight-average molecular weight: 3,000) were added and solution of an adhesive (a) was prepared.

A substrate sheet of a polyethylene terephthalate film having a thickness of 38 µm which was coated with a silicone resin on one face (manufactured by LINTEC Corporation; trade name of SP PET38) was coated with solution of an adhesive (a) prepared above on the face coated with a silicone resin. The substrate sheet coated with solution of an adhesive (a) was dried at 100° C. for 1 minute and an adhesive sheet having an adhesive layer having a thickness of 30 µm was prepared.

The prepared adhesive sheet was laminated to one face of a polarizing plate having a three-layer laminate structure composed of a film of triacetylcellulose, a film of polyvinyl alcohol and a film of triacetylcellulose in a manner such that the layer of the adhesive is attached to the polarizing plate. The obtained laminate was aged at the ordinary temperature for one week and adhesive optical component (a) having a length of 80 mm and a width of 150 mm was prepared.

Then, using two adhesive optical components (a) prepared above, the substrate sheets in the adhesive optical components were removed and the remaining adhesive optical components were laminated to both faces of a glass plate for a liquid crystal cell via the exposed layer of the adhesive so that an orthogonal Nicol is formed.

TABLE 1

|  | Example | | | Comparative Example | | |
|---|---|---|---|---|---|---|
|  | 1 | 2 | 3 | 1 | 2 | 3 |
| Adhesive layer | | | | | | |
| shear modulus (N/cm$^2$) | 5.4 | 6.3 | 5.3 | 7.9 | 5.6 | 8.0 |
| relaxation modulus (N/cm$^2$) | 2.2 | 3.5 | 2.1 | 9.7 | 3.1 | 9.7 |
| 100° C., dry, 1000 hours | | | | | | |
| durability | excellent | excellent | good | excellent | fair | good |
| formation of blank spots | excellent | good | good | poor | good | poor |
| 60 C., 90% humidity, 1000 hours | | | | | | |
| durability | excellent | excellent | good | excellent | fair | good |
| formation of blank spots | excellent | good | good | poor | good | poor |
| Staining of glass | good | good | good | good | poor | good |

As shown in Table 1, the durability and the prevention of formation of blank spots were excellent or good in all of Examples 1, 2 and 3. In contrast, in Comparative Examples 1 and 3, the prevention of formation of blank spots was poor and, in Comparative Example 2, lifting and peeling were found in the durability test although the formation of blank spots was prevented. In Examples 1 to 3, the glass was not stained. In contrast, the glass was stained in Comparative Example 2.

Example 4

Into 240 parts by weight of toluene, 100 parts by weight of a copolymer of acrylic esters having a weight-average molecular weight of 1,700,000 (containing 84% by weight of the unit of butyl acrylate, 15% by weight of the unit of methyl acrylate and 1% by weight of the unit of 2-hydroxyethyl acrylate), 20 parts by weight of an oligomer of acrylic esters having a weight-average molecular weight of 8,000 (containing 100% by weight of the unit of butyl The results of evaluation of the properties are shown in Table 2.

Separately, solution of an adhesive (b) and adhesive optical component (b) were prepared in accordance with the same procedures as those described above except that the amount of the oligomer of acrylic esters was increased from 20 parts by weight to 120 parts by weight and the amount toluene was increased from 240 parts by weight to 440 parts by weight. The properties of adhesive optical component (b) were evaluated and the results were compared with the results of adhesive optical component (a). The formation of blank spots and the staining of glass were prevented in the same degree in both adhesive optical components. Adhesive optical component (a) exhibited a shear modulus and a relaxation modulus of the adhesive layer greater than those of adhesive optical component (b). Adhesive optical component (a) exhibited more excellent durability than that of adhesive optical component (b).

Separately, solution of an adhesive (c) and adhesive optical component (c) were prepared in accordance with the same procedures as those described above except that 20 parts by weight of an oligomer of acrylic esters having a weight-average molecular weight of 800 (containing 100% by weight of the unit of butyl acrylate; the ratio of Mw/Mn: 4.0) was used. The properties of adhesive optical component (c) were evaluated and the results were compared with the results of adhesive optical component (a). The formation of blank spots was prevented in the same degree in both adhesive optical components. Adhesive optical component (a) exhibited a shear modulus and a relaxation modulus of the adhesive layer slightly greater than those of adhesive optical component (c). Adhesive optical component (a) exhibited more excellent durability than that of adhesive optical component (c).

Example 5

A solution of an adhesive was prepared in accordance with the same procedures as those conducted in Example 4 except that 0.2 parts by weight of a silane coupling agent (3-glycidoxypropyltrimethoxysilane) was further added.

Subsequently, the same procedures as those conducted in Example 4 were conducted. The results of evaluation of the properties are shown in Table 2.

Example 6

To 240 parts by weight of toluene, 100 parts by weight of the copolymer of acrylic esters used in the preparation of solution of an adhesive (a) in Example 4, 20 parts by weight of an oligomer of acrylic esters (containing 100% by weight of the unit of butyl acrylate; the ratio of Mw/Mn: 1.5), 0.1 part by weight of the difunctional adduct of isophorone diisocyanate used in the above and 0.1 part by weight of a trifunctional adduct of xylylene diisocyanate (manufactured by TAKEDA YAKUHIN KOGYO Co., Ltd.; the trade name: TAKENATE D-110N; the weight-average molecular weight: 1,100) were added and a solution of an adhesive was prepared.

Subsequently, the same procedures as those conducted in Example 4 were conducted. The results of evaluation of the properties are shown in Table 2.

TABLE 2

| Example | 4 | 5 | 6 |
|---|---|---|---|
| Adhesive layer | | | |
| shear modulus (N/cm²) | 5.0 | 5.1 | 6.0 |
| relaxation modulus (N/cm²) | 2.0 | 2.0 | 2.3 |
| 100° C., dry, 1000 hours | | | |
| durability | excellent | excellent | excellent |
| formation of blank spots | excellent | excellent | good |
| 60 C., 90% humidity, 1000 hours | | | |
| durability | good | excellent | excellent |
| formation of blank spots | excellent | excellent | good |
| Staining of glass | good | good | good |

As shown in Table 2, the durability, the prevention of formation of blank spots and the prevention of staining of glass were excellent in Examples 4, 5 and 6.

What is claimed is:

1. An adhesive composition which is the crosslinked product of components which comprise:
   (A) a copolymer of a (meth)acrylic ester having a weight-average molecular weight of 500,000 to 2,000,000, said weight-average molecular weight being the weight-average molecular weight of a corresponding Polystyrene obtained in accordance with gel permeation chromatography and
   (B) a crosslinking agent comprising an adduct of a polyisocyanate compound which comprises (a) isocyanate difunctional adducts of a diisocyanate compound with a diol and (b) adducts of a diisocyanate compound with a polyhydric alcohol, and having an isocyanate functionality of three or greater, in amounts such that a ratio of the amounts by weight of the difunctional adducts (a) and the adducts (b) is 95:5 to 10:90,
   wherein the copolymer (A) contains portions capable of reacting with the crosslinking agent (B), and wherein said crosslinking agent (B) is in an amount of 0.001 to 50 parts by weight per 100 parts by weight of said copolymer (A), wherein the diisocyanate compound which forms the adducts (a) or the adducts (b) is selected from the group consisting of tolylene diisocyanate, diphenylmethane diisocyanate, xylylene diisocyanate, hexamethylene diisocyanate, isophorone diisocyanate and hydrogenated diphenylmethane diisocyanate; the dial which forms adducts (a) is selected from the group consisting of ethylene glycol, 1,3-propanediol, 1,4-butanediol, 1,6-hexanediol, polyethylene glycol, polypropylene glycol and polytetramethylene glycol; the polyhydric alcohol which forms the adducts (b) is selected from the group consisting of glycerol, trimethylolpropane, trimethylolethane, pentaerythritol and dimers thereof.

2. An adhesive composition according to claim 1, wherein the component (B) is in an amount of 0.01 to 10 parts by weight per 100 parts by weight of the component (A).

3. An adhesive composition according to claim 1, wherein the copolymer of component (A) comprises a copolymer of (meth)acrylic ester in which the alkyl group in the ester portion has 1 to 20 carbon atoms and a monomer having a functional group having an active hydrogen.

4. An adhesive composition according to claim 3, wherein the (meth)acrylic ester comprises at least one member selected from the group consisting of methyl (meth)acrylate, ethyl (meth)acrylate, propyl (meth)acrylate, butyl (meth) acrylate, pentyl (meth)acrylate, hexyl (meth)acrylate, cyclohexyl (meth)acrylate, 2-ethylhexyl (meth)acrylate, isooctyl (meth)acrylate, decyl (meth)acrylate, dodecyl (meth)acrylate, myristyl (meth)acrylate, palmityl (meth)acrylate and stearyl (meth)acrylate; and the monomer having a functional group having an active hydrogen comprises at least one member selected from the group consisting of 2-hydroxyethyl (meth)acrylate, 2-hydroxypropyl (meth)acrylate, 3-hydroxypropyl (meth) acrylate, 2-hydroxybutyl (meth) acrylate, 3-hydroxybutyl (meth) acrylate, 4-hydroxybutyl (meth) acrylate, acrylamide, methacrylamide, N-methylacrylamide, N-methylmethacrylamide, N-methylolacrylamide, N-methylolmethacrylamide, monomethylaminoethyl (meth)acrylate, monoethylaminoethyl (meth) acrylate, monomethylaminopropyl (meth) acrylate, monoethyl-aminopropyl (meth) acrylate, acrylic acid, methacrylic acid, crotonic acid, maleic acid, itaconic acid and citraconic acid.

5. An adhesive composition according to claim 4, wherein the weight average molecular weight of the copolymer of component (A) is 800,000 to 1,800,000.

6. An adhesive composition according to claim 4, wherein the copolymer of component (A) is a copolymer of butyl acrylate, methyl acrylate and hydroxyethyl acrylate.

7. An adhesive composition according to claim 1, wherein said composition does not include a plasticizer.

* * * * *